United States Patent

[11] 3,552,283

[72] Inventors David Lockman Babcock;
 Hubert Nerwin, Rochester, N.Y.
[21] Appl. No. 716,576
[22] Filed Mar. 27, 1968
[45] Patented Jan. 5, 1971
[73] Assignee Eastman Kodak Company
 Rochester, N.Y.
 a corporation of New Jersey

[54] GROUND PLANE INDICIA MEANS
 13 Claims, 11 Drawing Figs.
[52] U.S. Cl. ............................................. 95/1.1,
 352/236
[51] Int. Cl. .................................... G03b 17/24
[50] Field of Search ................................ 95/1.1,
 12.5; 352/39, 50, 89, 170, 236(Inquired)

[56] References Cited
 UNITED STATES PATENTS
1,826,299 10/1931 Chamberlin .................. 95/12.5
2,047,070 7/1936 Horner ......................... 95/12.5
2,756,653 7/1956 Nistri ........................... 95/12.5

FOREIGN PATENTS
1,497,587 10/1967 France ......................... 95/1.1

Primary Examiner—John M. Horan
Assistant Examiner—Robert P. Greiner
Attorney—Robert W. Hampton and James J. Wood ABSTRACT: A ground plane indicia device for providing an image on exposed photographic film for the purpose of indicating the ground plane on the developed negative or positive print, regardless of the camera attitude at the time of shooting. The device comprises a transparent body which houses a weighted element adapted to nest in the lowermost corner of the body, under the discipline of the gravitational force. The transparent body may be positioned within the camera body proper, or within a roll film cartridge, the only requirement being that the transparent body be in the path of the exposing light from the subject being photographed to the film at the film plane of the camera. The developed negative or positive film contains an arrowlike imprint on the periphery of the film frame, the arrow pointing toward the ground plane, so that it may be used to conveniently orient the film or transparency.

PATENTED JAN 5 1971

DAVID L. BABCOCK
HUBERT NERWIN
INVENTORS

James J. Wood
Robert W. Hampton

ATTORNEYS

PATENTED JAN 5 1971

DAVID L. BABCOCK
HUBERT NERWIN
INVENTORS

James J. Wood
Robert A. Hampton
BY

ATTORNEYS

PATENTED JAN 5 1971

DAVID L. BABCOCK
HUBERT NERWIN
INVENTORS

BY James J. Wood
Robert W. Hampton

ATTORNEYS

GROUND PLANE INDICIA MEANS

BACKGROUND OF THE INVENTION

This invention relates to indicia means imprinted on a photographic film negative or positive for the purpose of indicating the ground plane, regardless of camera attitude at the time of exposure. In ordinary photography, it is not particularly important that the ground plane be identified because the viewer can readily turn the developed picture to the correct orientation. However, in the slide projection art, a slide placed upside down in a projector is the cause of considerable annoyance, disturbing an orderly presentation and requiring a reorientation. It is therefore desirable to have some means for indicating the ground level or datum plane of reference so that in assembling a number of slides for presentation purposes, the ground plane may be quickly and accurately identified.

The prior art has been aware of the inconvenience and annoyance of slides projected upside down. U.S. Pat. No. 1,633,376 to Freeman proposes that each slide holder have a cutoff corner so that this may be felt in a darkened room, so that the slide may be properly oriented. French Pat. No. 1,306,129 and the patent of addition thereto No. 82,014 to Trubert proposes notching the slide frame for assisting in the proper orientation of a plurality of slides.

The instant invention teaches mounting means on a camera or roll film cartridge for placing a ground plane indicia imprint on the exposed film in a unique manner, so as to record the direction of the ground plane at the time of historical occurence. In the practice of the invention, the orientation of the photographic negative or positive with respect to ground, may therefore be accomplished with greater celerity and accuracy.

SUMMARY OF THE INVENTION

This invention relates to a ground plane indicia means for providing a ground orienting marker on an exposed photographic film, so that the developed film, positive or negative, may be quickly oriented with respect to the ground plane by visual observation. This is accomplished by utilizing a transparent chamber containing a weighted means, the sides of the chamber being oriented at an angle with respect to the horizontal plane. The transparent chamber may then be placed either within the camera body proper or incorporated as part of a roll film cartridge, the only requirement being that it be positioned in the path of the exposing light reflected from the subject being photographed to the film at the exposure station or film plane. The developed film negative or positive print contains an arrowlike imprint which is indicative direction of the ground plane.

Accordingly, it is an object of this invention to provide a ground plane indicia means providing an indication on a film negative or positive print to enable quick and accurate orientation of the film with respect to the ground plane, regardless of camera attitude at the time of picture taking.

The novel features which are believed to be characteristic of the invention are set forth with particularity in the appended claims. The invention itself, however, both as to its organization and method of operation, together with further objects and advantages thereof, may best be understood by references to the following description taken in connection with the accompanying drawings.

DESCRIPTION OF PREFERRED EMBODIMENTS

Figure 1:
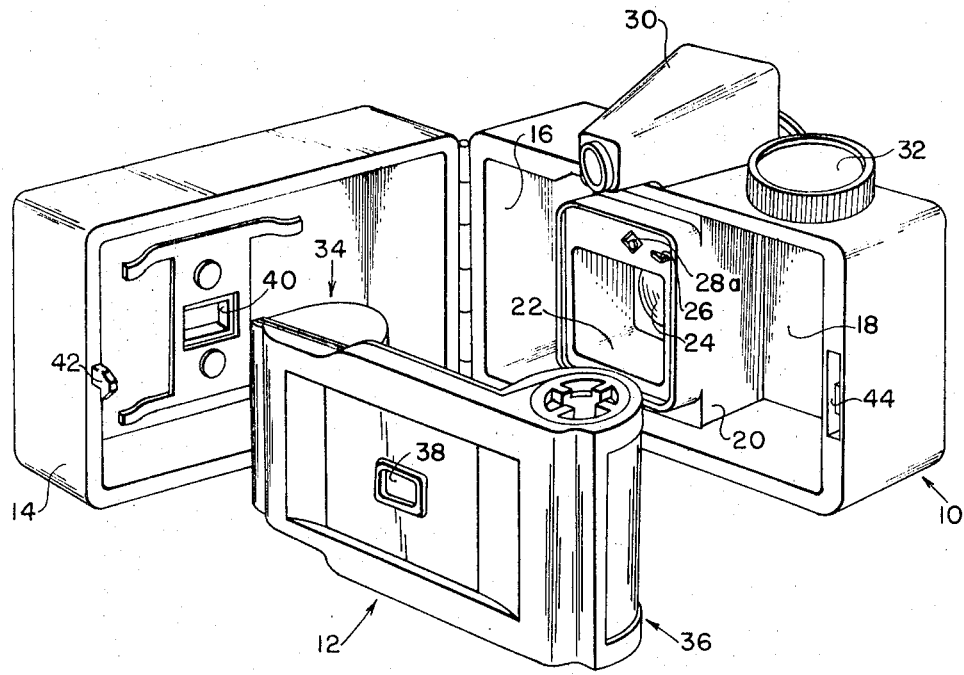
FIG. 1 is a perspective view of a camera, showing the ground plane indicia means incorporated into the camera and depicting a roll film cartridge in position for insertion into the camera.

A rudimentary camera, utilizing the ground plane indicia means of the present invention, is shown in FIG. 1; this camera includes a main body housing 10, a roll film cartridge indicated generally at 12, and a hinged cover 14. The main body 10 has recessed chambers at each end indicated at 16 and 18, respectively. Located centrally of the camera body, is a boxlike member 20, which is recessed at 22, and includes a lens means 24 for admitting light to the film plane by means of a shutter (not shown).

A film metering pawl 26 is also included as part of the boxlike member 20, with the ground plane indicia means indicated generally at 28a. A viewfinder is indicated at 30, a film advancing knob being identified at 32.

The roll film cartridge 12 is fabricated from molded plastic components, sealed or glued together in any convenient manner to provide a lighttight arrangement, having a film supply chamber indicated generally at 34 at one end, and a film takeup chamber indicated generally at 36 at the opposite end. The roll film cartridge 12 has a window at 38, which is adapted to cooperate with a similar aperture 40 in the hinged cover 14, so as to enable the camera user to determine how many film frames have been exposed.

When the camera is loaded, preparatory to picture taking, the cartridge 12 is inserted in the main body 10, the film supply chamber 34 being adapted to fit into the recess 16, and the film takeup chamber 36 being adapted to fit within the recess 18. The camera is then locked in lighttight arrangement, the hinged cover 14 closing upon the main body 10 and locking by means of the latch 42 on the hinge cover 14, engaging with the locking recess 44 on the main body housing 10.

In order to more fully understand the role played by the ground plane indicia means, it will be helpful to complete the description of the roll film cartridge 12.

Figure 2:
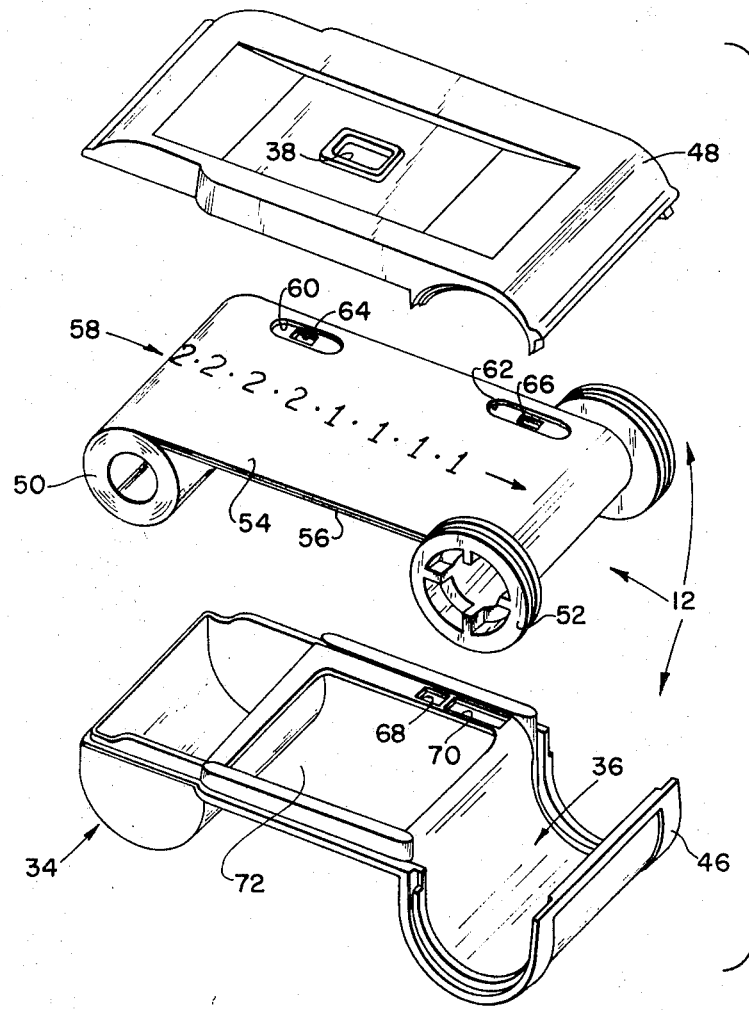
FIG. 2 is an exploded perspective view of a roll film and backing paper, utilized in a roll film cartridge, and showing the aperture in the web of the roll film cartridge to enable exposure access for the latent image of the ground plane indicia on the photographic film.

Considered in connection with FIG. 2, the molded film cartridge 12 comprises a molded plastic cartridge body 46, a molded plastic cartridge cover 48, a film supply roll 50, and a takeup spool 52. A strip of light protective paper 54 provides backing for the photographic film 56. In assembling the cartridge, the protective paper 54 and photographic film 56 are initially wound upon the film supply roll 50, and then threaded upon the takeup spool 52. The backing paper 54 includes identifying numeration as indicated generally at 58. The backing paper has a series of elongated openings, such as indicated at 60, 62, on one edge, which cooperate with similar openings 64, 66, respectively on the film 56. The openings 64, 66 are engageable by the metering pawl 26 to successively advance the film by means not shown. The molded plastic cartridge body 46 includes a light admitting aperture 68 and an elongated slot 70. The large recessed opening 72 defines the overall dimensions of the exposed negative. As previously indicated, in the fabrication stage, the roll film spool 50 is placed within the chamber 36, and the cover 48 then being placed against the molded plastic part 46 in mating engagement, the entire molded plastic cartridge being then sealed by any convenient means, such as heat or adhesive material to provide a lighttight roll film cartridge. The processed and ready-to-use cartridge has the physical appearance shown in FIG. 5.

Figure 5:
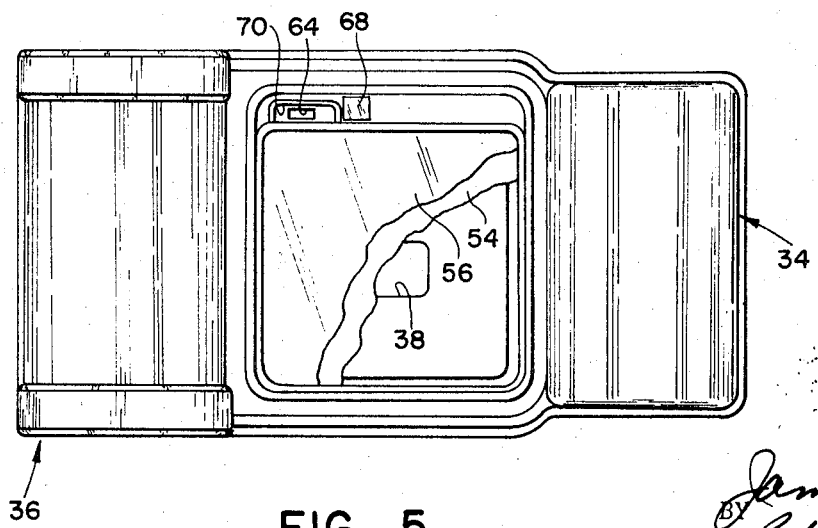
FIG. 5 is a pictorial view of a roll film cartridge depicting the overlaps of film and backing paper, and showing the exposure aperture in the web.

In the arrangement shown in FIG. 5, the pawl metering means 26 is adapted to fit within the aperture 70 in the body member 46, and into one of the apertures 60 or 62, which is approximately in register with an aperture 64 or 66 on the film 56, the film being advanced from one exposure to the next by any convenient means (not shown on the drawing).

Figure 3A:
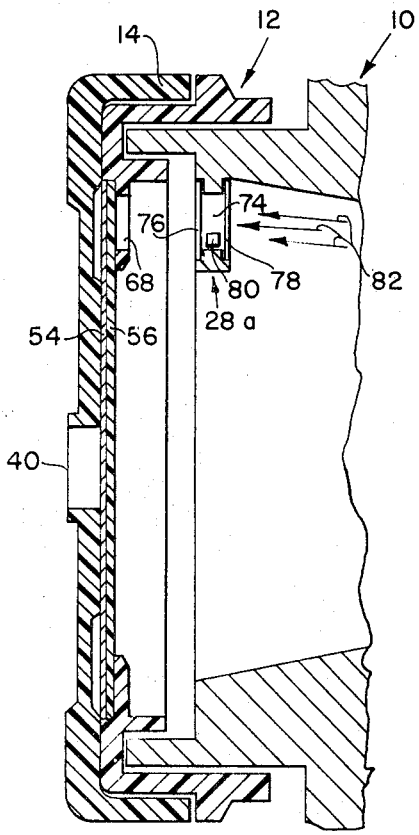
FIG. 3a is a partial cross-sectional view taken through the camera, showing the ground plane indicia means incorporated as part of the camera body, and also indicating the roll film cartridge with its cooperating exposure aperture in position within the camera proper.
Figure 3B:
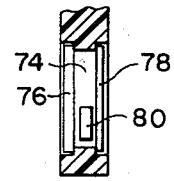
FIG. 3b is an enlarged partial cross-sectional view of the ground plane indicia means.

Referring now to FIG. 3a, the ground plane indicia means 28a is a transparent cavity or chamber comprising a recess 74 enclosed on each side by means of light admitting windows 76,78 for receiving weighted means 80 which may conveniently be a ball or disc member, arranged so that it may be relatively constrained to move with one degree of freedom within the recess 74, under the influence of gravity. As will be appreciated from a study of FIG. 3a, when the shutter is opened, the light entering the camera includes a bundle of light rays 82 which pass through the windows 76,78 and through the aperture 68 in the film cartridge 12 to the film 56 to record a latent image on the film of the position of the weighted means 80, which position is a function of the instantaneous attitude of the camera.

Figure 4A:
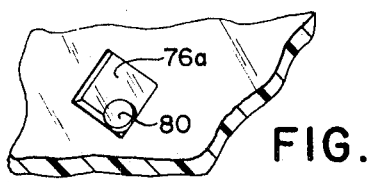
FIG. 4a is a partial view showing one configuration of the ground plane indicia means.
Figure 4B:
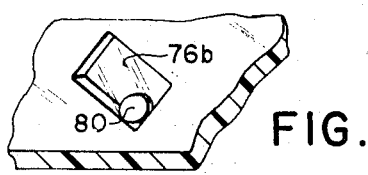
FIG. 4b is a partial view showing another configuration of the ground plane indicia means.

The windows 76,78 may take a number of forms; for example, they may be rhombi, slightly rounded at the corners, as illustrated by window 76a in FIG. 4a, or the windows may be rhomboidal, slightly rounded at the corners, as illustrated by window 76b in FIG. 4b. Similarly, it is also within the scope of the invention to have the window 76a square, slightly rounded at the corners, and the window 76b rectangular slightly rounded at the corners.

Figure 6:
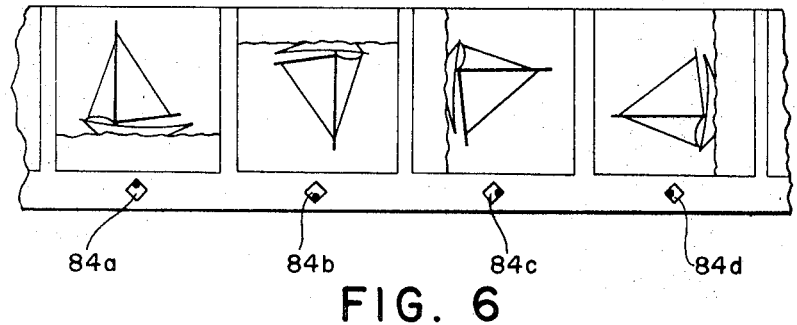
FIG. 6 is a positive photographic print depicting various pictures of a sailing scene with the camera in different attitudes, and indicating how the ground plane indicia imprint may be used to orient these prints with respect to the horizon.

In order to understand how the indicia means of this invention is utilized for the proper orientation with respect to the ground or horizon, reference will be had to FIG. 6, which depicts a positive print, showing a sailing boat filmed with different attitudes for the camera. The ground plane indicia imprint for the four prints or pictures is indicated at 84a, 84b, 84c, and 84d, respectively. Each picture contains a black dot (an image of the disc 80), the remaining portion forming a white arrow which points downward to indicate the ground plane. A study of each of the pictures will indicate that this is so in each case. (The film negative may be similarly oriented).

While it may seem strange at first that the ball or disc 80, under the discipline of gravity, should be in the upper position, a moment's reflection will recall that the photographic subject is imaged upside-down at the exposure station, or film plane. Since the process of photographic printing is an inversion process, so the outline of the disc 80 which is defined by the latent silver halide image on the negative film, appears as a developed dot image on the positive prints as shown in FIG. 6.

Figure 7:
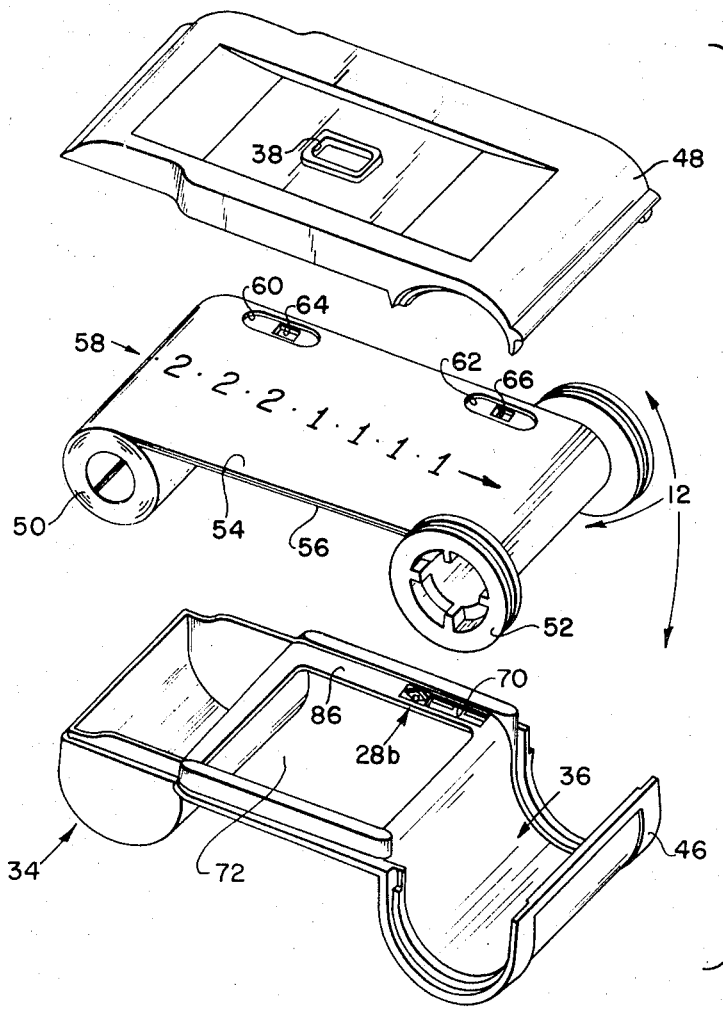
FIG. 7 is an exploded view of a roll film cartridge similar to FIG. 2, but showing the ground plane indicia means incorporated as an integral part of the roll film cartridge.

The ground plane indicia means need not be incorporated as part of the camera body proper, but may be fabricated as a part of the roll cartridge 12. This is illustrated in FIG. 7, where the web 84 of the molded plastic body portion 46 has been adapted to receive the ground plane indicia means indicated generally at 28b.

Figure 8:
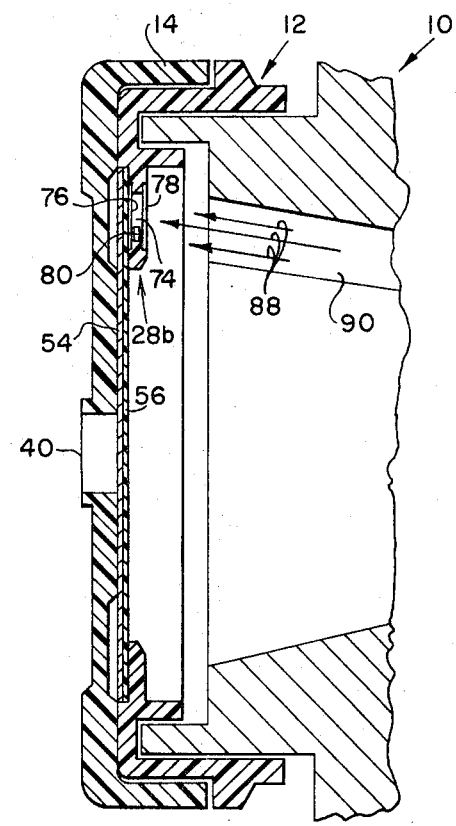
FIG. 8 is a partial cross-sectional view taken through the camera showing the roll film cartridge of FIG. 7 in cooperative position within the camera.

As viewed in the cross-sectional partial view shown in FIG. 8, the ground plane indicia means 28b provides an indicia image upon the film 56, in the same manner, a bundle of light beams 88 passing through a suitably apertured opening 90 in the camera body.

Figure 9:
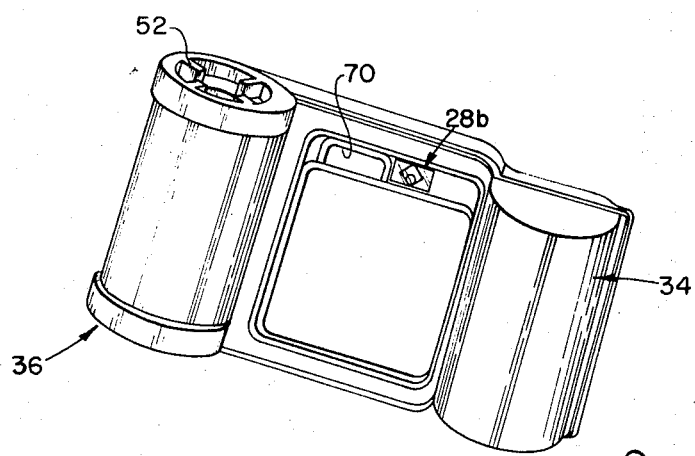
FIG. 9 is a perspective view of the roll film cartridge of FIG. 7 showing the ground plane indicia means.

A perspective view of the cartridge is shown in FIG. 9 with the ground plane indicia means shown at 28b.

The invention has been described in detail with particular reference to preferred embodiments thereof, but it will be understood that variations and modifications can be effected within the spirit and scope of the invention as described hereinabove and as defined in the appended claims.

We claim:

1. A ground plane indicia means for a camera having light admitting means through which a film in the camera is exposed, comprising:
    a. body means mounted within the camera, said body means defining a unitary chamber in the path of the light passing through the light admitting means when an image exposure is made, said chamber having a plurality of corners;
    b. weighted means freely movable within the chamber under gravitational force discipline, and seatable in one of said corners as a function of the orientation of the camera relative to a ground plane; and
    said weighted means and said chamber cooperating to define a light passageway of a configuration forming an indicia on the film when an image exposure is made, and which when developed indicates the ground plane for the image.

2. Ground plane indicia means according to claim 1 wherein said chamber has the geometric configuration of a rhombus.

3. Ground plane indicia means according to claim 1 wherein said chamber has the geometric configuration of a rhomboid.

4. Ground plane indicia means according to claim 1 wherein said chamber has the geometric configuration of a rectangle.

5. Ground plane indicia means according to claim 1 wherein said chamber has the geometric configuration of a square.

6. Ground plane indicia means according to claim 1 wherein said weighted means has the geometric configuration of a disc arranged to be moveable between said transparent windows.

7. Ground plane indicia means according to claim 1 wherein said chamber has parallel, spaced apart transparent windows, and said weighted means is interposed between said windows and has the geometric configuration of a disc, the planar faces of which are arranged in spaced relationship from and substantially parallel to said parallel transparent windows.

8. A roll film cartridge adapted for loading into a camera having light admitting means through which a film in the camera is exposed, comprising:
    a. body means mounted within the camera, said body means defining a unitary chamber in the path of the light passing through the light admitting means when an image exposure is made, said chamber having a plurality of corners;
    b. weighted means freely movable within the chamber under gravitational force discipline, and seating in one of said corners as a function of the position of the camera relative to a ground plane; and said weighted means and said chamber cooperating to define a light passageway of a configuration forming an indicia on the film when an image exposure is made which when developed indicates the ground plane for the image.

9. A roll film cartridge according to claim 8 wherein said chamber has the geometric configuration of a rhombus.

10. A roll film cartridge according to claim 8 wherein said chamber has the geometric configuration of a rhomboid.

11. A roll film cartridge according to claim 8 wherein said chamber has the geometric configuration of a rectangle.

12. A roll film cartridge according to claim 8 wherein said chamber has the geometric configuration of a square.

13. A roll film cartridge according to claim 8 wherein said weighted means has the geometric configuration of a disc the planar faces of which are arranged in spaced relationship from and substantially parallel to said parallel transparent windows.

Disclaimer 3,552,283.—*David Lockman Babcock* and *Hubert Nerwin*, Rochester, N.Y. GROUND PLANE INDICIA MEANS. Patent dated Jan. 5, 1971. Disclaimer filed June 5, 1972, by the assignee, *Eastman Kodak Company*.

Hereby enters this disclaimer to claims 6 and 8 through 13 of said patent.
[*Official Gazette August 15, 1972.*]